Dec. 10, 1957    E. S. KARSTENS    2,815,582
SHAFT ALIGNING FIXTURE
Filed June 14, 1954
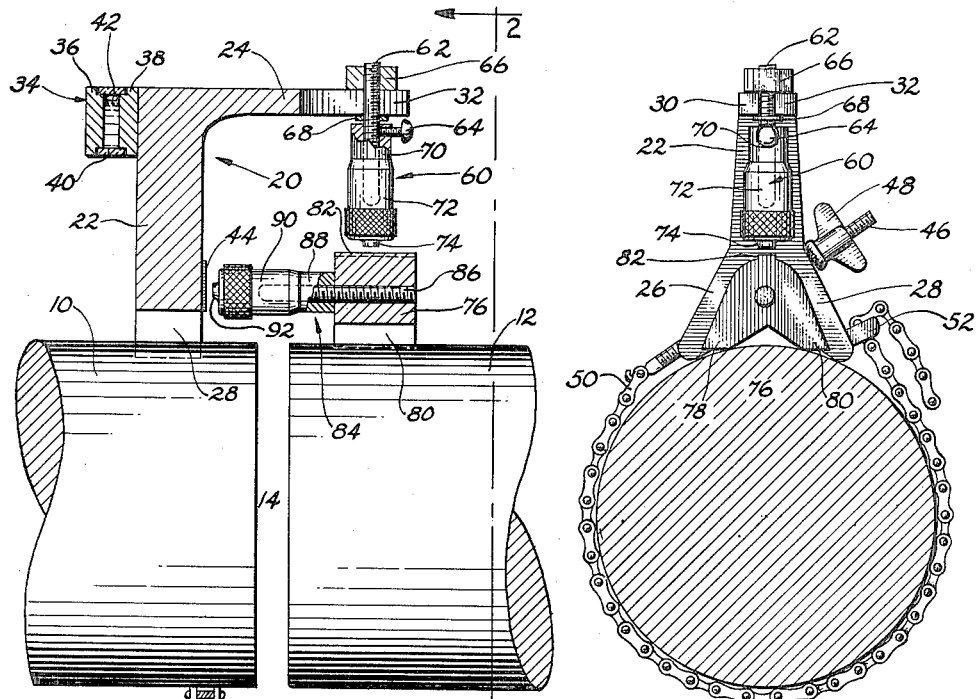
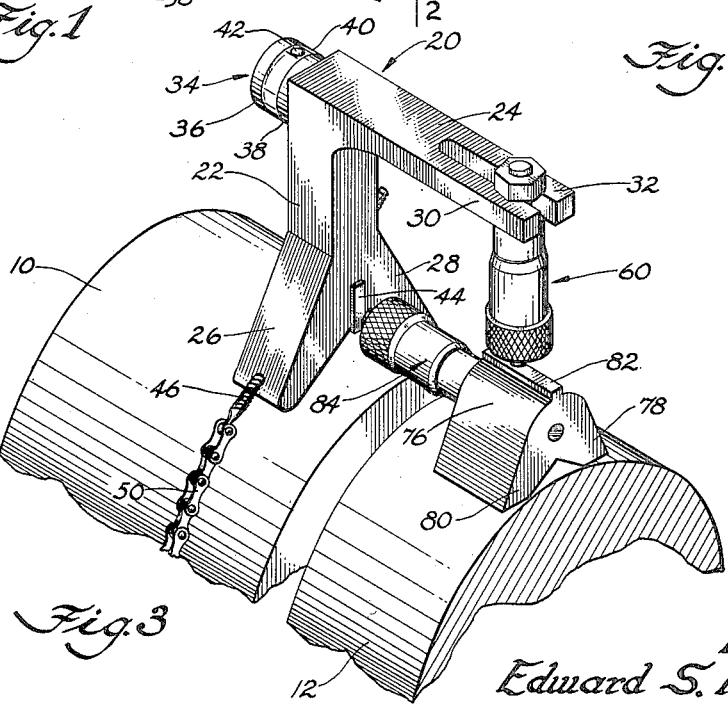
Inventor
Edward S. Karstens
by Bair, Freeman & Molinare
Attys.

United States Patent Office 2,815,582
Patented Dec. 10, 1957

2,815,582

SHAFT ALIGNING FIXTURE

Edward S. Karstens, Davenport, Iowa, assignor of one-half to Bernard B. Karstens, Davenport, Iowa Application June 14, 1954, Serial No. 436,343

8 Claims. (Cl. 33—180)

This invention relates generally to a shaft aligning fixture, and more particularly to micrometric means for determining with great accuracy the degree of mis-alignment of a pair of coupled shafts.

The successful operation of high speed rotating equipment such as pumps, turbines, generators and the like, requires that the coupling between the driven shaft of the rotating equipment and the drive shaft of the driving or power unit be made with great care and accuracy so that the interconnected shafts are as nearly aligned to a zero reference as is possible. In practice, the use of a flexible coupling between the shafts of such power driven equipment will not effectively compensate for mis-alignment of the shafts.

Although in conventional practice the shafts of rotating equipment may be initially aligned with great care by leveling the supporting bed plates, there will be a certain degree of spring when the units are installed, and it is necessary subsequently to make a careful and accurate check of actual shaft alignment. After such equipment has been in initial operation for a few hours under normal operating conditions, it is generally necessary to again make a further or final check of shaft alignment.

Since in certain installations mis-alignment between coupled shafts may be of critical importance, it is a primary object of the present invention to provide a novel shaft aligning means which will permit measurement of shaft mis-alignments to be made within accuracies of $1/10000$ of an inch.

It is another object of this invention to provide a shaft aligning unit comprising a pair of micrometer supporting fixtures which each provide a reference surface for co-operation with the micrometer of the opposite cooperating fixture.

It is a further object of this invention to provide micrometer supporting fixtures of the character disclosed, having base portions providing double line contact with the shafts to be aligned so as to permit the positioning of axial and radial reference surfaces with respect to the axial alignment of each of the respective shafts.

It is a further object of this invention to provide a method for accurately aligning a pair of coupled shaft ends which comprises the steps of accurately measuring the parallelity and concentricity of the shafts at a plurality of circumferentially spaced measuring stations.

Figure 1 is a cross sectional view in side elevation showing the shaft aligning fixtures of the present invention in cooperative position upon the respective ends of a pair of shafts to be aligned;

Figure 2 is an end view taken substantially as indicated by line 2—2 on Figure 1; and Figure 3 is a perspective view of the shaft aligning fixtures of the present invention in operative position on adjacent shaft ends.

Referring now to the drawing, I have indicated the opposed ends 10 and 12 of a pair of shafts which are to be accurately aligned. The shafts are shown with their ends relatively spaced from each other so as to provide an air gap 14 therebetween. It is to be understood, of course, that the shaft aligning fixtures of the present invention may be employed with equal efficiency in the alignment of flexibly coupled shafts, as well as spacer and floating-type couplings. The shaft arrangement described herein is intended merely for purposes of illustrating the practical use of my invention.

A first micrometer supporting bracket fixture 20 is indicated in association with the shaft end 10. The fixture 20 is positioned on the shaft end 10 so as to extend outwardly therefrom in a radial direction with respect to the longitudinal axis of the shaft. The fixture 20 includes a base portion 22, and an overhanging cantilever portion 24 which extends at right angles from the base portion 22. A pair of angularly outspread legs 26 and 28 are provided for engagement with the outer peripheral supporting surface of the shaft. The legs 26 and 28 provide a pair of straight line contacts for engagement with the surface of the shaft. In this manner, the fixture 20 is accurately disposed with respect to the axis of the shaft so that the base portion 22 will extend radially outwardly therefrom at right angles, and the overhanging portion 24 will be parallel to the longitudinal axis of the shaft.

The overhanging portion 24 has a bifurcated or yoke-like end providing a pair of spaced terminal arms 30 and 32. These arms serve to support micrometric measuring means in a manner to be hereinafter described in detail.

A spirit level 34 is secured to the fixture 20. The level 34 comprises a pair of half portions 36 and 38, and an intermediate length of cylindrical glass tubing which forms a sighting glass 40. The three portions 36, 38 and 40 are tightly secured together in sealing engagement by means of a suitable bolt (not shown) which also serves to attach the entire level unit to the supporting fixture 20. The space within the sighting glass 40 contains the usual liquid and air bubble 42. It will be apparent that the level 34 provides a means for positioning the fixture 20 at top or bottom vertical center lines along the shaft, or at horizontal center lines at the sides of the shaft, as desired.

The inner vertical surface of the base portion 22 provides a radial reference surface or anvil 44 facing toward the shaft end 12. Because of the double line supporting contact of the legs 26 and 28 of the fixture 20, the reference surface 44 will be positioned radially with respect to the longitudinal axis of the supporting shaft.

An adjusting screw 46 extends through the base portion 22 of the fixture 20 and is provided with a wing nut 48 at its one end. A link chain 50 is fixedly secured to the screw 46 at its end opposite the wing nut 48. The link chain 40 is of sufficient length so as to extend around the circumference of the supporting shaft for attachment to a link-engaging prong 52 at the opposite side of the bracket base 22, as clearly seen in Figure 2 of the drawing. In this manner, the fixture 20 may be securely clamped in an adjusted position upon the shaft end 10.

A first micrometer 60 is supported by the overhanging portion 24 of the fixture 20. The micrometer 60 is carried by a screw 62 which extends centrally therethrough. The screw 62 may be adjustably positioned within the micrometer 60 and fixed in its adjusted position by means of a set screw 64. A pair of cooperating screw-threaded locking members 66 and 68 are carried by the screw 62 at opposite sides of the arms 30 and 32 so as to permit the screw 62 to be fixed in an adjusted position relative to the overhanging bracket portion 24.

The micrometer 60 is of conventional construction and includes a sleeve 70, a thimble 72, and a movable spindle 74. The micrometer 60 is graduated from 0 to .250, and permits measurements to $1/10,000$ of an inch.

A second micrometer supporting bracket fixture 76 is provided with a pair of angularly outspread legs 78 and 80, similar to the legs 26 and 28 of the bracket 20. The fixture 76 may be supportingly positioned upon the outer peripheral surface of the shaft end 12, and provides double line contact therewith so as to be in parallel axial alignment with the longitudinal axis of the shaft. The fixture 76 is preferably formed of a permanent Alnico magnet for removable securement to the metallic shaft end 12. Although an adjustable attaching means such as the chain means 46, 48, 50, and 52 may be employed, I prefer to magnetize the fixture 76 for reasons of safety in avoiding injury to the micrometers and anvil reference surfaces, as will be made more apparent in the discussion of the operation of the present invention.

The axially extending fixture 76 provides a second reference surface or anvil 82 along its top outer surface. It will be apparent that the double line contact provided by the legs 78 and 80 with the outer surface of the shaft end 12 will serve to dispose the anvil 82 in parallel alignment with the longitudinal axis of the shaft end 12. A second micrometer 84 is fixedly secured to and carried by the fixture 76 by means of a mounting screw 86. The micrometer 84 is of conventional construction and includes a sleeve 88, a thimble 90, and a movable spindle 92.

It will be apparent from the foregoing description that I have provided a pair of supporting brackets or fixtures each having double line contact with the outer peripheral surface of the respective shaft ends so as to be in aligned position relative to the longitudinal axes of the supporting shafts. The supporting fixtures 20 and 76 provide radial and axial reference surfaces 44 and 82, respectively. Each of the reference surfaces 44 and 82 constitute fixed anvils for cooperation with the movable spindles 92 and 74, respectively, of the micrometers 84 and 60 of the opposite cooperating brackets.

*Operation*

In the practical operation of the present invention the radial supporting bracket fixture 20 is fixedly secured to the shaft end 10 closely adjacent its terminal surface so as to permit the overhanging portion 24 to extend over a substantial portion of the adjacent shaft end 12. The fixture 20 is preferably initially disposed at a top center vertical position, as determined by the level 34, and is securely locked in place by the adjustable attaching means 46, 48, 50, and 52.

The axial supporting bracket fixture 76 is set on the shaft end 12 at substantially the top-center position as determined by rough eye alignment with the previously adjusted fixed bracket 20. The micrometer 84 is set at a zero reading and the entire fixture 76 is slidingly moved toward the bracket 20 so as to bring the anvils 44 and 92 in contacting engagement with each other. In this manner, a zero reading is provided as an initial first station reference measurement for the condition of contacting engagement between the anvils 44 and 92.

The shaft 10 is then rotated 90° so as to bring the bracket 20 to a side-horizontal position, as determined by the spirit level 34, which provides a second measuring station. The shaft 12 is similarly rotated so as to bring the fixture 76 into opposite cooperative relation with the bracket 20 at the side center position of the second measuring station. Prior to rotation of the shaft 12, it is desirable to withdraw the micrometer anvil 92 toward the fixture 76 by rotation of the thimble 90. This will prevent possible conflicting engagement between the anvils 44 and 92 as a result of the shaft rotation, which might damage the tools or displace the fixture 76 from its initial position on the shaft end 12. Possible bracket displacement would, of course, render any measurements at the second station useless.

The thimble 90 of the micrometer 84 is then rotated so as to bring the anvils 44 and 92 into contacting engagement at the second station. The reading of the micrometer at this second station will serve to measure the misalignment of the shafts at this point with respect to the initial first reference station. Plus or minus readings at the second station will indicate the amount by which the shafts are closer together or farther apart at the second station than they were at the first station.

The shafts are next rotated to a bottom-center third station, and to a side-horizontal fourth station, and the above sequence of adjustments and measurements is repeated so as to obtain corresponding readings at these positions. A comparison of the various readings will serve to indicate the amount by which the shafts are non-parallel. Suitable adjustments may then be made so as to correct the parallel mis-alignment between the shafts. If necessary, the sequence of measurements may be repeated as a check on the accuracy of the adjustments.

A second series of measurements must then be made, preferably at substantially the same four stations, to determine the amount by which the shafts are non-concentric. At the first station, top-center, the micrometer 60 is set at a zero reading and adjustably positioned along the screw 62 so as to bring the anvils 74 and 82 into contacting engagement. The set screw 64 may then be adjusted so as to fix the parts in position. The thimble 72 may then be rotated to provide a clearance between the anvils 74 and 82, and the shafts rotated to a second station, side-center. Counter-rotation of the thimble 72 at the second station to bring the anvils 74 and 82 back into contact will provide a second reading. This operation is repeated at a third station, bottom-center, and a fourth station, side-center.

Assuming the shafts to have been properly adjusted with respect to parallelity by the first sequence of operations, a comparison may now be made between the readings at top and bottom-center stations, and the readings at the opposed side-center stations. The differences in readings represent the amounts by which the shafts are non-concentric, and appropriate adjustments may then be made so as to bring the shafts into accurate alignment. If necessary, the sequence of measurements may be repeated to provide a final check.

By forming the fixture 76 of magnetic material it is possible to quickly effect manual adjusting movements thereof along the outer surface of the supporting shaft end. Also, if the operator should fail to observe the precaution of withdrawing the micrometer to a safe clearance distance prior to rotation of the shafts, no damage to the tools will result because any contacting engagement therebetween will merely serve to effect a shifting of the slidable magnetic fixture 76. Such an inadvertent conflict between the tools will, of course, destroy the usefulness of any readings already made, and the sequence of operations must be begun anew.

It will be apparent that my novel arrangement of supporting brackets, providing radial and axial reference surfaces, and micrometric means for determining relative spacings therebetween, permits a determination of the misalignment between shaft ends within accuracies of $1/10,000$ of an inch. Use of my invention will permit adjustment of shaft couplings with great accuracy to near-zero alignment.

Changes may be made in the construction and arrangement of the parts of my shaft aligning fixture without departing from the real spirit and purpose of my invention, and it is my intention to cover by my claims any modified forms of structure or use of mechanical improvements which may be reasonably included within their scope.

What I claim as new and desire to obtain by Letters Patent of the United States is:

1. Means for determining the mis-alignment of a pair of spaced shaft ends, comprising a pair of bracket fixtures each having a base providing double line contact portions adapted to engage the outer peripheral surface of a shaft end, one of said fixtures when engagingly positioned upon a corresponding shaft end providing an axially disposed reference surface, the other of said fixtures when engagingly positioned upon a corresponding shaft end providing a radially disposed reference surface, and each of said fixtures carrying measuring means for coaction with the reference surface of the other of said fixtures.

2. Means for determining the mis-alignment of a pair of spaced shaft ends, comprising a pair of bracket fixtures each having a base providing double line contact portions adapted to engage the outer peripheral surface of a shaft end, one of said fixtures when engagingly positioned upon a corresponding shaft end providing an axially disposed reference surface, the other of said fixtures when engagingly positioned upon a corresponding shaft end providing a radially disposed reference surface, and micrometer means carried by each of said fixtures, the micrometer of one fixture coacting with the reference surface of the other fixture and vice versa.

3. Means for determining the mis-alignment of a pair of spaced shaft ends, comprising a pair of bracket fixtures each having a base providing double line contact portions adapted to engage the outer peripheral surface of a shaft end, mounting means adapted to fixedly attach said fixtures to a pair of shaft ends, one of said fixtures when engagingly positioned upon a corresponding shaft end providing an axially disposed reference surface, the other of said fixtures when engagingly positioned upon a corresponding shaft end providing a radially disposed reference surface, and each of said fixture carrying measuring means for coaction with the reference surface of the other of said fixtures.

4. Means for determining the mis-alignment of a pair of spaced shaft ends, comprising a pair of bracket fixtures each having a base providing double line contact portions adapted to engage the outer peripheral surface of a shaft end, first adjustable mounting means adapted to fixedly attach one of said fixtures to one shaft end, second magnetic mounting means adapted to attach the other of said fixtures to another shaft end in slidably adjustable relation thereto, one of said fixtures when engagingly positioned upon a corresponding shaft end providing an axially disposed reference surface, the other of said fixtures when engagingly positioned upon a corresponding shaft end providing a radially disposed reference surface, and each of said fixture carrying measuring means for coaction with the reference surface of the other of said fixtures.

5. Means for determining the mis-alignment of a pair of spaced shaft ends, comprising first and second bracket fixtures each having a base providing double line contact portions adapted to engage the outer peripheral surface of a shaft end, said second fixture having a portion overhanging said first fixture when said fixtures are in adjusted cooperative relation, one of said fixtures when engagingly positioned upon a corresponding shaft end providing an axially disposed reference surface, the other of said fixtures when engagingly positioned upon a corresponding shaft end providing a radially disposed reference surface, a first micrometer carried by said first fixture for coaction with the reference surface of said second fixture, and a second micrometer carried by the overhanging portion of said second fixture for coaction with the reference surface of said first fixture.

6. Means for determining the mis-alignment of a pair of spaced shaft ends, comprising first and second bracket fixtures each having a base providing double line contact portions adapted to engage the outer peripheral surface of a shaft end, first adjustable mounting means adapted to fixedly attach one of said fixtures to one shaft end, second magnetic mounting means adapted to attach the other of said fixtures to another shaft end in slidably adjustable relation thereto, said second fixture having a portion overhanging said first fixture when said fixtures are in adjusted cooperative relation, one of said fixtures when engagingly positioned upon a corresponding shaft end providing an axially disposed reference surface, the other of said fixtures when engagingly positioned upon a corresponding shaft end providing a radially disposed reference surface, a first micrometer carried by said first fixture for coaction with the reference surface of said second fixture, and a second micrometer carried by the overhanging portion of said second fixture for coaction with the reference surface of said first fixture.

7. Means for determining the mis-alignment of a pair of spaced shaft ends, comprising first and second bracket fixtures each having a base providing double line contact portions adapted to engage the outer peripheral surface of a shaft end, said second fixture having a portion overhanging said first fixture when said fixtures are in adjusted cooperative relation, one of said fixtures when engagingly positioned upon a corresponding shaft end providing an axially disposed reference surface, the other of said fixtures when engagingly positioned upon a corresponding shaft end providing a radially disposed reference surface, a first micrometer carried by said first fixture for coaction with the reference surface of said second bracket, a second micrometer carried by the overhanging portion of said second fixture for coaction with the reference surface of said first fixture, and leveling means for adjustably positioning said fixtures at predetermined circumferentially spaced stations on the shaft ends.

8. In an aligning device for determining the mis-alignment of a pair of near-axially aligned shaft ends, a pair of bracket fixtures each having a base providing double line contact portions engaging the outer peripheral surface of a respective shaft end, one of said fixtures when engagingly positioned upon one of said shaft ends providing a reference surface axially aligned with respect to the longitudinal axis of said shaft end, the other of said fixtures when engagingly positioned upon the other shaft end providing a reference surface radially disposed with respect to the longitudinal axis of said other shaft end, and each of said fixtures carrying measuring means for coaction with the reference surface of the other of said fixtures.

References Cited in the file of this patent

UNITED STATES PATENTS

| | | |
|---|---|---|
| 2,024,020 | Aldeborgh | Dec. 10, 1935 |
| 2,089,790 | Halpern | Aug. 10, 1937 |
| 2,446,621 | Thiry | Aug. 10, 1948 |
| 2,525,068 | Ericson | Oct. 10, 1950 |
| 2,572,999 | Elliott | Oct. 30, 1951 |
| 2,630,633 | Webb | Mar. 10, 1953 |
| 2,700,224 | Johnson | Jan. 25, 1955 |